Patented Jan. 3, 1950

2,493,578

UNITED STATES PATENT OFFICE 2,493,578

CYANOALKYLAMINO DERIVATIVES OF ACRIDINE AND METHOD FOR THEIR PRODUCTION

Alan August Goldberg and William Kelly, Bradford-on-Avon, England, assignors to Ward, Blenkinsop & Company Limited, Halewood, Liverpool, England, a British company, and Howards & Sons Limited, Ilford, Essex, England, a British company No Drawing. Application November 28, 1945, Serial No. 631,475
In Great Britain November 28, 1944

11 Claims. (Cl. 260—279)

This invention relates to acridine derivatives containing in the meso-position a cyanoalkylamino substituent and to a process for the production thereof.

The present invention provides meso-(cyanoalkylamino)-acridine derivatives of the general formula

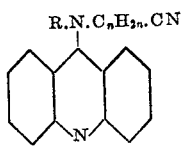

R.N.C$_n$H$_{2n}$.CN in which R is selected from the group consisting of hydrogen and alkyl, aryl and aralkyl groups and $n$ is an integer not greater than twelve.

The process according to the present invention for the production of a cyanoalkylamino derivative of acridine of the general formula

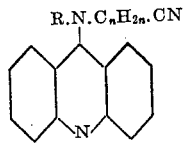

R.N.C$_n$H$_{2n}$.CN in which R is selected from the group consisting of hydrogen and alkyl, aryl and aralkyl groups and $n$ is an integer not greater than twelve, comprises heating a mesohalogenated acridine with a cyanoalkylamine of the general formula R.NH.C$_n$H$_{2n}$.CN in which R and $n$ are as above defined.

The cyanoalkylamine employed may be an aminoacetonitrile or a C-alkyl aminoacetonitrile having the general formula RNH.CR$^1$R$^2$.CN in which R is as above defined and R$^1$ and R$^2$ are hydrogen or alkyl groups, at least one being an alkyl group. Aminoacetonitrile may itself be used in the process according to the invention as well as the N-mono alkyl, aryl or aralkyl substituted aminoacetonitriles, such as N-methylamino acetonitrile, N-ethylamino acetonitrile and N-phenylamino acetonitrile.

The C-alkyl aminoacetonitriles may or may not, as indicated above, be N-monosubstituted and when both the groups R$^1$ and R$^2$ are alkyl groups these may be like or unlike. Thus there may be employed α-amino-propionitrile, α-amino-n-butyronitrile, α-amino-iso-butyronitrile, α-amino-iso-valeronitrile, α-amino-iso-capronitrile and α-amino-α-methyl-n-capronitrile. Examples of the N-mono alkyl, aryl and aralkyl substituted nitriles which may also be used are α-ethylaminopropionitrile, α-iso-butylaminopropionitrile, α-iso-amylaminopropionitrile, α-phenylamino-propionitrile, α-n-propylamino-n-butyronitrile, α-phenylamino-n-butyronitrile, α-methylamino-iso-butyronitrile, α-ethylamino-iso-butyronitrile, α-phenylamino-iso-butyronitrile, α-ethyl-α-methylamino-n-butyronitrile, α-methyl-α-phenylamino-n-butyronitrile, α-ethyl-α-phenylamino-n-butyronitrile, α-phenylamino-n-valeronitrile and α-phenylamino-iso-valeronitrile.

Other acylonitriles in which the amino group is attached to a carbon atom other than that most proximate the nitrile group, i. e. to the carbon atom in the omega position with respect to the nitrile group or in any position intermediate the alpha-position and the omega-position with respect to the nitrile group, may also be employed in the process according to the invention. Examples of such acylonitriles are β-aminopropionitrile, β-amino-n-butyronitrile, γ-amino-n-butyronitrile, ε-amino-capronitrile and ω-amino-n-caprylonitrile. There may also be employed the corresponding N-mono-alkyl, aryl or aralkyl substituted nitriles, such as β-methylamino-n-butyronitrile, β-ethylamino-n-butyronitrile, ω-methylamino-n-butyronitrile and ω-ethylamino-n-caprylonitrile.

The mesohalogenated acridines which may be used in accordance with the invention are preferably meso-chloroacridines. In addition to the meso-halogen substituent the acridines may contain one or more nuclear substituents such as alkyl, alkoxy, nitro, amino, substituted amino, cyano or halogens in either or both of the benzenoid nuclei. Examples of such compounds are 9-chloroacridine, 9-bromoacridine, 2-methoxy-9-chloroacridine, 2- and 3-cyano-9-chloroacridines, 2-methoxy-6-cyano-9-chloroacridines, 2-methoxy-7-cyano-9-chloroacridine, 2-methoxy-6,9-dicholoracridine, 2-methoxy-6,9-dibromoacridine and 2-dimethylamino-6,9-dichloroacridine.

The reaction employing either an N-unsubstituted or an N-mono substituted cyanoalkylamine and a mesohalogenated acridine is conveniently brought about by heating the reactants together in a suitable solvent. Suitable solvents are the normally liquid lower alkanols which are preferably anhydrous. A small quantity of copper powder is advantageously introduced into the reaction mixture. The resulting meso-(cyanoalkylamino)-acridine is obtained in the form of the hydrohalide from which the free base may be liberated and isolated in known manner.

The reaction employing an N-unsubstituted cyanoalkylamine and a meso-halogenated acridine can also be brought about by heating the reactants together with an excess of a phenol whence the resulting meso-(cyanoalkylamino)-acridine derivative may conveniently be isolated by pouring the reaction mixture into ether or acetone and separating therefrom. Trituration of the product with aqueous alkali enables the free base to be obtained. In this method of carrying out the process according to the invention the intermediate 9-phenoxy acridine derivative is formed but not necessarily isolated: it is on this account that an excess of phenol should be used. Phenol itself or a mixture of the isomeric cresols or higher alkylated phenols may be used. Mixed alkylated phenols may also be used. Alternatively the reaction product of the mesohalogenated acridine and the phenol employed may be first formed by heating these together and the resulting product, with or without intermediate isolation, then heated with the N-unsubstituted cyanoalkylamine.

The following examples illustrate the manner in which the invention may be carried into effect. All the parts are by weight.

*Example 1*

A mixture consisting of 50 parts of 9-chloroacridine, 20 parts of α-aminopropionitrile and 400 parts of phenol is heated at 120–130° C. for 2 hours with occasional stirring. The mixture is poured into 1200 parts of acetone and the precipitate collected and shaken with ammonium hydroxide. The resulting product which is 9-(α-cyanoethylamino)-acridine, is recrystallized from dilute alcohol and is obtained in the form of brown prisms. M. Pt. 226–228°.

*Example 2*

50 parts of 2-methoxy-6:9-dichloroacridine are dissolved in 400 parts of phenol and the solution heated on the steam bath for 0.5 hour and cooled. 24 parts of ε-aminocapronitrile are added, the mixture heated on the water bath for 2 hours and poured into an excess of ether containing a trace of alcoholic hydrogen chloride. The separated solid is collected, washed with ether and ground with dilute ammonia. The insoluble material is filtered off and on recrystallisation from aqueous methanol gives 55 parts of ε-[2-methoxy-6-chloroacridyl-(9)-]-amino capronitrile in the form of brown prisms. M. Pt. 83–85°. Recrystallisation from the same solvent gives the pure compound in brown prisms. M. Pt. 87–88° (found : N, 11.7. $C_{20}H_{20}ON_3CL$ requires N, 11.9%).

We claim:

1. As a new product a meso-(cyanoalkylamino)-acridine of the general formula

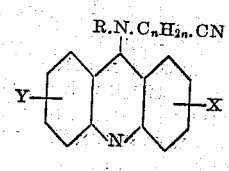

in which R is selected from the group consisting of hydrogen and alkyl, aryl and aralkyl groups, X is selected from the group consisting of hydrogen and alkoxy, Y is selected from the group consisting of hydrogen and halogen, and $n$ is an integer not greater than twelve.

2. As a new product a meso-(cyanoalkylamino)-acridine of the general formula

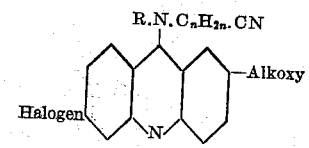

in which R is selected from the group consisting of hydrogen and alkyl, aryl and aralkyl groups and $n$ is an integer not greater than twelve.

3. As a new product a meso-(cyanoalkylamino)-acridine of the general formula

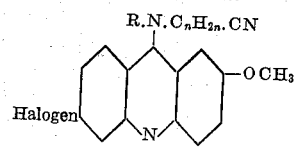

in which R is selected from the group consisting of hydrogen and alkyl, aryl and aralkyl groups and $n$ is an integer not greater than twelve.

4. As a new product a meso-(cyanoalkylamino)-acridine of the general formula

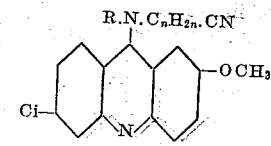

in which R is selected from the group consisting of hydrogen and alkyl, aryl and aralkyl groups and $n$ is an integer not greater than twelve.

5. As a new product 9-(α-cyanoethylamino)-acridine crystallizing in the form of brown prisms and having a melting point of 226–228° C.

6. As a new product ε-[2-methoxy-6-chloroacridyl-(9)-]-amino-capronitrile crystallizing in the form of brown prisms and having a melting point of 87–88° C.

7. A process for the production of a meso-(cyanoalkyl-amino)-acridine derivative of the general formula

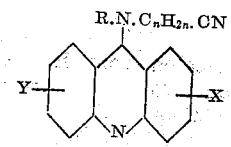

in which A is selected from the group consisting of hydrogen and alkyl, aryl and aralkyl groups, X is selected from the group consisting of hydrogen and alkoxy, Y is selected from the group consisting of hydrogen and halogen, and $n$ is an integer not greater than twelve which comprises heating a mesohalogenated acridine carrying the substituents X and Y with a cyanoalkylamine having the general formula $R.NH.C_nH_{2n}.CN$ in which R and $n$ are as above defined in the presence of an organic hydroxylated solvent selected from the group consisting of normally liquid alkanols and phenols.

8. A process for the production of a meso-(cyanoalkylamino)-acridine derivative of the general formula

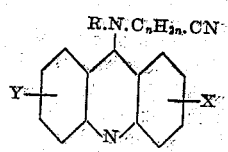

in which R is selected from the group consisting of hydrogen and alkyl, aryl and aralkyl groups, X is selected from the group consisting of hydrogen and alkoxy, Y is selected from the group consisting of hydrogen and halogen, and $n$ is an integer not greater than twelve, which comprises heating a meso-phenoxy acridine carrying the substituents X and Y with a cyanoalkylamine having the general formula R.NH.C$_n$H$_{2n}$.CN in which R and $n$ are as above defined to produce a meso-(cyanoalkylamino)-acridine having the above general formula.

9. A process for the production of a meso-(cyanoalkylamino)-acridine derivative of the general formula

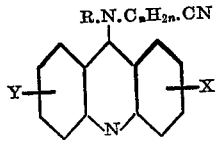

in which R is selected from the group consisting of hydrogen and alkyl, aryl and aralkyl groups, X is selected from the group consisting of hydrogen and alkoxy, Y is selected from the group consisting of hydrogen and halogen, and $n$ is an integer not greater than twelve which comprises heating a meso-halogenated acridine carrying the substituents X and Y with a cyanoalkylamine having the general formula R.NH.C$_n$H$_{2n}$.CN in which R and $n$ are as above defined in the presence of a normally liquid alkanol and a trace of copper powder to produce a meso-(cyanoalkylamino)-acridine having the above general formula.

10. A process for the production of a meso-(cyanoalkylamino)-acridine derivative of the general formula

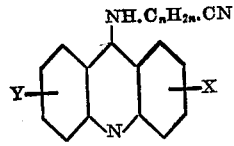

in which X is selected from the group consisting of hydrogen and alkoxy, Y is selected from the group consisting of hydrogen and halogen, and $n$ is an integer not greater than twelve which comprises heating a meso-phenoxy acridine carrying the substituents X and Y with a cyanoalkylamine having the general formula NH$_2$.C$_n$H$_{2n}$.CN in which $n$ is as above defined to produce a meso-(cyanoalkylamino)-acridine having the above general formula.

11. A process for the production of a meso-(cyanoalkylamino)-acridine derivative of the general formula

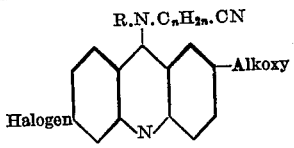

in which R is selected from the group consisting of hydrogen and alkyl, aryl and aralkyl groups and $n$ is an integer not greater than twelve, which comprises heating a mesophenoxy acridine carrying halogen and alkoxy substituents as indicated in the above formula with a cyanoalkylamine having the general formula RNHC$_n$H$_{2n}$.CN in which R and $n$ are as above defined to produce a meso-(cyanoalkylamino)-acridine having the above general formula.

ALAN AUGUST GOLDBERG.
WILLIAM KELLY.

REFERENCES CITED

The following references are of record in the file of this patent:

UNITED STATES PATENTS

| Number | Name | Date |
|---|---|---|
| 1,629,873 | Jensch | May 24, 1927 |
| 2,113,357 | Mietzsch et al. | Apr. 5, 1938 |

OTHER REFERENCES

Chemical Abstracts, vol. 35 (1941), page 4025 citing: Braz, J. Gen. Chem. (U. S. S. R.), 10, 1751–1756 (1940).

Chemical Abstracts, vol. 36 (1942), page 4122.